(12) United States Patent
Weiss et al.

(10) Patent No.: US 7,156,528 B2
(45) Date of Patent: Jan. 2, 2007

(54) RETROREFLECTIVE ELEMENTS AND ARTICLES

(75) Inventors: Douglas E. Weiss, Golden Valley, MN (US); Rebecca A. Shipman, Woodbury, MN (US); Craig S. Chamberlain, Woodbury, MN (US); James D. Heininger, New Richmond, WI (US); Thomas P. Hedblom, Eagen, MN (US); Gerald S. Deeb, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/761,770

(22) Filed: Jan. 21, 2004

(65) Prior Publication Data

US 2005/0157390 A1 Jul. 21, 2005

(51) Int. Cl.
*G02B 5/122* (2006.01)
(52) U.S. Cl. ............................ 359/529; 264/1.9
(58) Field of Classification Search ............... 359/534, 359/529, 530; 264/1.9, 1.31
See application file for complete search history.

(56) References Cited

U.S. PATENT DOCUMENTS

| | | | |
|---|---|---|---|
| 3,043,196 A | 7/1962 | Palmquist et al. | |
| 3,171,827 A | 3/1965 | De Vries et al. | |
| 3,175,835 A | 3/1965 | Garrison | |
| 3,252,376 A | 5/1966 | De Vries | |
| 3,254,563 A | 6/1966 | De Vries et al. | |
| 3,274,888 A | 9/1966 | Vanstrum et al. | |
| 3,418,896 A | 12/1968 | Rideout | |
| 3,486,952 A | 12/1969 | Vanstrum et al. | |
| 3,587,415 A | 6/1971 | Eigenmann | |
| 4,100,625 A | 7/1978 | Tung | |
| 4,342,800 A | 8/1982 | Changani et al. | |
| 4,545,832 A | 10/1985 | Hoffmann | |
| 4,563,388 A | 1/1986 | Bonk et al. | |
| 4,607,978 A | 8/1986 | Eigenmann | |
| 4,652,172 A | 3/1987 | Eigenmann | |
| 4,731,273 A | 3/1988 | Bonk et al. | |
| 4,983,458 A | 1/1991 | Dejaiffe | |
| 4,988,541 A | 1/1991 | Hedblom | |
| 4,988,555 A | 1/1991 | Hedblom | |
| 5,092,109 A | 3/1992 | Maki-Rahkola et al. | |
| 5,417,515 A | 5/1995 | Hachey et al. | |
| 5,419,651 A * | 5/1995 | Fei ............................ | 404/14 |
| 5,670,227 A | 9/1997 | Hedblom et al. | |
| 5,683,746 A | 11/1997 | Hedblom et al. | |
| 5,750,191 A | 5/1998 | Hachey et al. | |
| 5,774,265 A | 6/1998 | Mathers et al. | |
| 5,777,791 A | 7/1998 | Hedblom | |
| 5,822,120 A | 10/1998 | Palazzotto et al. | |
| 5,835,271 A * | 11/1998 | Stump et al. ............... | 359/529 |
| 6,054,208 A | 4/2000 | Rega et al. | |
| 6,127,020 A | 10/2000 | Bacon, Jr. et al. | |
| 6,166,106 A | 12/2000 | Purgett et al. | |

(Continued)

FOREIGN PATENT DOCUMENTS

EP 0 046 027 2/1982

(Continued)

OTHER PUBLICATIONS

Pending U.S. Appl. No. 10/761,533, filed Jan. 21, 2004.

*Primary Examiner*—Euncha P. Cherry
(74) *Attorney, Agent, or Firm*—Carolyn A. Fischer

(57) ABSTRACT

The present invention relates to retroreflective elements and retroreflective articles such as pavement markings comprising retroreflective elements, methods of making retroreflective elements, and laminates.

28 Claims, 2 Drawing Sheets

U.S. PATENT DOCUMENTS

| | | |
|---|---|---|
| 6,247,818 B1 | 6/2001 | Hedblom et al. |
| 6,303,058 B1 | 10/2001 | Kelley et al. |
| 6,412,957 B1 | 7/2002 | Oba |
| 6,451,408 B1 | 9/2002 | Haunschild et al. |
| 6,479,132 B1 | 11/2002 | Hedblom et al. |
| 6,533,961 B1 | 3/2003 | Harelstad et al. |
| 6,652,954 B1 * | 11/2003 | Nielsen et al. ............... 428/143 |
| 6,805,933 B1 | 10/2004 | Patel et al. |
| 2002/0186472 A1 * | 12/2002 | Sloot .......................... 359/530 |

FOREIGN PATENT DOCUMENTS

| | | |
|---|---|---|
| EP | 0 102 585 | 3/1984 |
| EP | 0 134 689 | 3/1985 |
| EP | 0 565 765 | 10/1993 |
| EP | 0 789 102 | 8/2001 |
| GB | 1531480 | 11/1978 |
| JP | 60011314 | 1/1985 |
| JP | 8-5809 | 12/1996 |
| WO | WO 01/29587 | 4/2001 |
| WO | WO 01/52962 | 7/2001 |

* cited by examiner

RETROREFLECTIVE ELEMENTS AND ARTICLES

FIELD OF THE INVENTION

The present invention relates to retroreflective elements and retroreflective articles such as pavement markings and retroreflective sheeting comprising retroreflective elements, methods of making retroreflective elements, laminates, and methods of use for such retroreflective articles.

BACKGROUND OF THE INVENTION

The use of pavement markings to guide and direct motorists traveling along a roadway is well known. Pavement markings are typically retroreflective so motorists can see the markings at night. Retroreflection describes the mechanism where light incident on a surface is reflected so that much of the incident beam is directed back toward its source. A common retroreflective pavement marking comprises glass or glass-ceramic microspheres partially embedded in a pigmented paint. When the surface of the pavement marking becomes wet, the microspheres become coated with water, which in turn reduces the retroreflection.

Various retroreflective elements or aggregates have been described in the art for use in pavement markings.

For example, U.S. Pat. No. 3,418,896 (abstract) describes reflective elements which are flat on their upper and lower surfaces and which have vertical side walls covered by a plurality of small glass spheres partially embedded in the vertical side walls, the width of the flat surfaces being at least twice the thickness of the elements and the thickness being in the order of 1/8–1/2" and the width not exceeding 1". The reflective elements can be incorporated into reflective markers for improved nighttime retroreflectivity especially in rainy weather. The elements can be incorporated into a hot-sprayed liquid binder that is solvent-free.

As another example, U.S. Pat. No. 5,750,191 describes a process and retroreflective elements are provided. The process of preparing a retroreflective element includes the steps of (a) combining a bed of optical elements and one or more core elements comprising a thermoplastic material; and (b) agitating the combination of optical elements and core elements for a sufficient period of time and at a sufficient temperature to coat the optical elements onto the core elements to form retroreflective elements.

As another example, U.S. Pat. No. 6,247,818 teaches a method for making retroreflective elements that are retroreflective under dry and-or wet conditions. The method provides a means for placing optical elements and/or skid-resistant particles on selected surfaces.

Although various retroreflective elements have been identified, industry would find advantage in alternative retroreflective elements having improved manufacturing efficiency and/or improved performance.

SUMMARY OF THE INVENTION

In one embodiment, the invention relates to a pavement marking comprising a plurality of retroreflective elements partially embedded in a binder. In another embodiment, the invention relates to retroreflective elements. In yet another embodiments, the invention relates to a retroreflective article such as a sign, tape, traffic device and personal safety apparel comprising retroreflective elements of the invention at least partially embedded in a binder.

In one aspect, the invention discloses retroreflective elements that have an exposed outer viewing surface comprising retroreflective sheeting and a layer beneath the viewing surface comprising a shrunk film layer.

In another aspect, the invention discloses a laminate comprising retroreflective sheeting having a viewing surface and an opposing surface and a shrinkable layer disposed beneath (e.g. bonded) to the opposing surface of the sheeting. Such laminate is useful as an intermediate for forming retroreflective elements of the invention.

In other embodiments, the invention relates to methods of making retroreflective elements.

In other embodiments, the invention relates to methods of use for the retroreflective elements of the invention.

For each of these embodiments, a cross-section of at least a portion of the retroreflective elements may comprise an edge of retroreflective sheeting in a shape of at least one coil or in a substantially circular shape. The retroreflective elements preferably comprise an outside diameter ranging from about 0.5 mm to 4 mm. At least a portion of the retroreflective elements may comprise a substantially solid core. The core may comprise a shrunk film, a filament, a polymeric material (e.g. film), and combinations 5 thereof. The retroreflective sheeting may be an exposed-lens or an enclosed-lens sheeting. The retroreflective elements as well as the sheeting comprises optical elements such as glass microspheres, glass-ceramic microspheres, and cube corner elements. The optical elements are at least partially embedded in a polymeric layer on the viewing surface of the retroreflective sheeting. Preferably, the optical elements layers are provided as the preformed retroreflective sheeting.
dr

DETAILED DESCRIPTION

Figure 1:
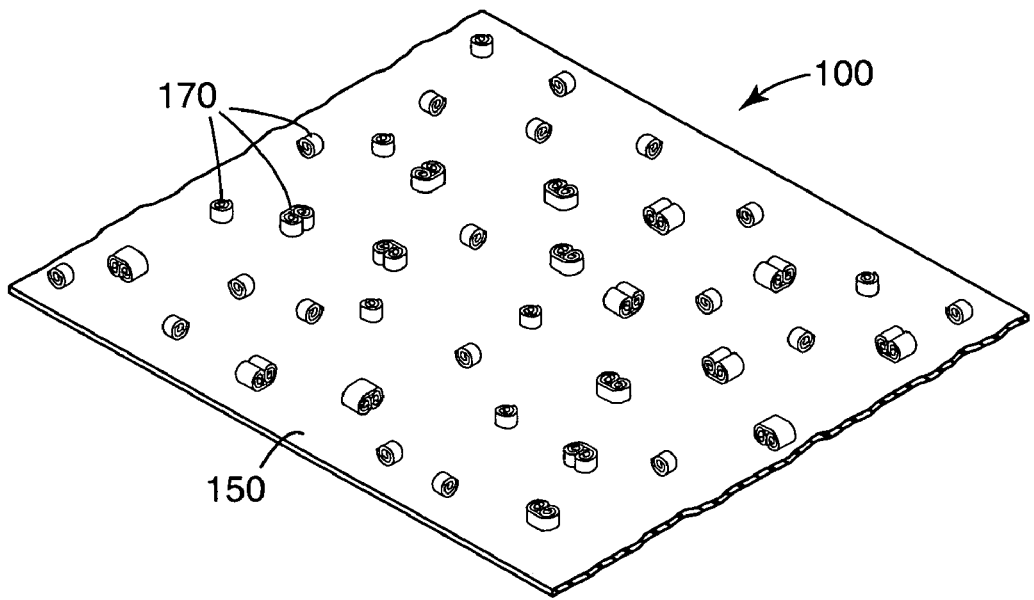
FIG. 1 depicts an illustrative perspective view of retroreflective articles of the invention comprising retroreflective elements.

The retroreflective elements of the invention can be employed for producing a variety of retroreflective products or articles such as retroreflective sheeting and in particular pavement markings. With reference to FIG. 1, an exemplary retroreflective article 100 comprises a binder layer 150 and a multitude of retroreflective elements 170 embedded at least partially into the binder surface such that at least a portion of the reflective elements are exposed on the surface.

Figure 2:
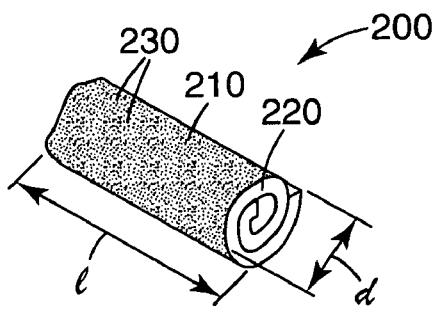
FIG. 2 depicts an enlarged perspective view of an illustrative retroreflective element.

The retroreflective articles (e.g. pavement markings) of the invention comprise novel retroreflective elements. With reference to FIG. 2, an exemplary retroreflective element 200 can generally be defined as having an exposed surface 210 about a first dimension (e.g. length) of the element 330 and a cross-sectional dimension 220 (e.g. width). The retroreflective elements of the invention share the common feature that the exposed surface about the first dimension (e.g. length) of the element is substantially covered with optical elements 230, e.g. the viewing surface of retroreflective sheeting.

The retroreflective elements of the invention are preferably prepared from preformed retroreflective sheeting. A variety of know retroreflective sheeting may be employed. Such retroreflective sheeting may be retroreflective alone, or may provide retroreflection only after being combined with a topcoat. The two most common types of retroreflective sheeting are microsphere-based sheeting and cube corner-based sheeting. In general, retroreflective sheeting is substantially planar having two major surfaces, i.e. a non-viewing surface and a viewing surface comprising optical elements at least partially embedded in a polymeric layer. Although cube corner elements and glass or glass-ceramic microspheres are the most common optical elements, granules, flakes, fibers, etc. may also be employed provided that the optical elements reflect light either independently or when combined with a diffusely reflecting core.

Figure 3A:
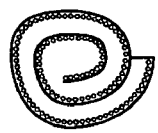
FIG. 3a–3d depict illustrative views of end-portions and/or cross-sections of exemplary elements.
Figure 3B:
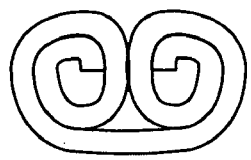
Figure 3C:
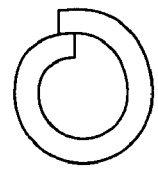
Figure 3D:
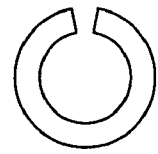

In some embodiments, such as depicted in FIG. 2 and FIGS. 3a and 3b, depicting cross-sectional views and/or end views of illustrative retroreflective elements, the retroreflective elements comprise retroreflective sheeting that (e.g. along the lengthwise direction) has been coiled onto itself. As used herein coil refers to having at least two concentric ring portions having a continuous layer of optical elements embedded in a polymeric layer there between. In the case of 3b, both edges (e.g. along the length) of the retroreflective sheeting have been coiled. In the case of 3c, opposing edges of retroreflective sheeting are overlapped. Each of these embodiments share the common feature that an interior portion of the elements comprises at least one layer of optical elements. Since the interior layer of optical elements is provided by the retroreflective sheeting, it is apparent that the layer(s) of optical elements is discreet rather than being dispersed throughout the interior of the retroreflective elements. Accordingly, within the interior portion are discreet continuous layers of optical elements adjacent to layers being free of optical elements. Once the outer surface layer of the retroreflective elements of the invention (i.e. the layers comprising optical elements) has been abraded away due to wear, the elements are no longer retroreflective. However, eventually the retroreflective elements having coiled or overlapping optical layers will become retroreflective again upon abrading down to the subsequent layers of optical elements within the core of the element. Alternatively, as depicted in FIG. 3d, the edges of the retroreflective sheeting may approach contacting each other, optionally with a small gap. Regardless, however, the viewing surface of the retroreflective elements of the invention is substantially covered with optical elements.

The performance of the retroreflective articles of the invention can be evaluated by a variety of techniques. Typically, pavement markings are evaluated by determining the Coefficient of Retroreflected Luminance ($R_L$) as described in ASTM E1710, ASTM E2176-01 and ASTM E2177-01 using an entrance angle of 88.76 degrees, and an observation angle of 1.05 degrees. $R_L$ can be determined with the pavement marking is dry or wet. In the case of "new" pavement markings the wet reflectivity may be determined with use of a soap solution. The addition of soap decreases the surface tension of the water simulating weathering of a pavement marking since the surface tension of a pavement marking increases as it oxidizes, abrades, etc.

In some preferred embodiments the retroreflective articles (e.g. pavement markings) exhibit comparable $R_L$, yet are surmised to be considerably more cost effective due to employing less retroreflective sheeting overall. For example, in a pavement marking tape the entire viewing surface often consists of retroreflective sheeting. In contrast, when the retroreflective elements of the invention are provided at an average coverage of about one element per square centimeter, only about 14% by area of the amount of retroreflective sheeting is used.

For other embodiments wherein the elements are larger in size or more retroreflective elements are provided per area (e.g. more than 1 element per square centimeter), the amount of retroreflective sheeting employed may be 20%, 30%, 40%, 50%, 60%, 70%, 80%, 90% and even 100% by area or greater in comparison to articles comprising retroreflective sheeting on their entire viewing surface.

In other preferred embodiments, the retroreflective elements of the invention provide improved retroreflective properties, i.e. higher $R_L$ values. For example, when an exposed-lens type retroreflective sheeting or optical layer is provided, the dry retroreflectivity can be improved. In some embodiments, the $R_L$ value when dry is at least 2000 mcd/m$^2$/lux, at least 2500 mcd/m$^2$/lux, at least 3000 mcd/m$^2$/lux, and at least 3500 mcd/m$^2$/lux. Surprisingly, in some embodiments the $R_L$ value when dry is at least 4000 mcd/m$^2$/lux, at least 5000 mcd/m$^2$/lux, at even least 6000 mcd/m$^2$/lux. In other embodiment, the wet reflectivity (i.e. with soap to decrease surface tension) is improved and is at least 1500 mcd/m$^2$/lux, at least 2000 mcd/m$^2$/lux, at least 2500 mcd/m$^2$/lux, and at least 3000 mcd/m$^2$/lux. Optimal wet and dry retroreflected brightness can be obtained by use of a combination of retroreflective elements wherein first elements provide dry retroreflectivity and second elements provide wet retroreflectivity. Optimal wet and dry retroreflected brightness can also be obtained by use of retroreflective elements having a combination of high $R_L$ value when dry and when wet. For example, the retroreflective elements can have any of the previously stated $R_L$ values when dry in combination with any of the previously stated $R_L$ value when dry.

The retroreflective elements can conveniently be prepared by various suitable methods, at least some of which are amenable to continuous processing.

Figure 4:
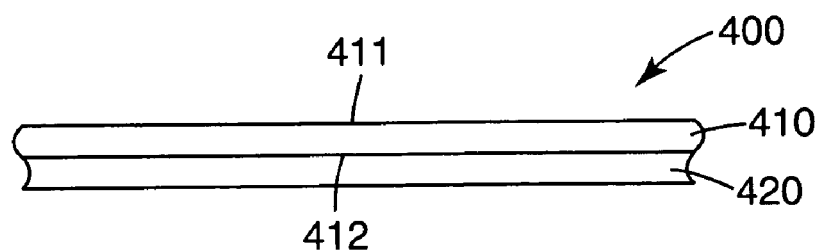
FIG. 4 depicts an illustrative perspective view of retroreflective articles of the invention comprising retroreflective elements.

One method of making retroreflective elements of the invention comprises (a) providing a laminate 400 of FIG. 4 comprising (i) retroreflective sheeting 410 having a viewing surface 411 and an opposing (i.e. non-viewing) surface 412 and (ii) a shrinkable layer 420 disposed on the non-viewing surface of the sheeting, and (b) shrinking the film layer. This is typically accomplished by (e.g. permanently) attaching the non-viewing surface of retroreflective sheeting to a shrinkable film layer. Alternatively, the retroreflective sheeting can be manufactured upon a shrinkable film layer. It is convenient to attach the shrinkable film layer to an entire sheet or entire roll of retroreflective sheeting and then cut the laminate into a desirable size. For example, the sheeting can be cut into a plurality of strips wherein the width of the strip corresponds to the eventual circumference or coiled cross-sectional (e.g. width) of the retroreflective element (i.e. after shrinking). The length of the strip may correspond to the length of the retroreflective element. Alternatively, however, the length of the strip may be considerably longer such that one or more (e.g. continuous) coils or tubular shaped strands are formed that are subsequently cut into discrete retroreflective elements.

Typically the shrinkable film shrinks in a single direction, wherein the edges of the sheeting normal to the direction of shrinkage typically curl towards each other forming either circular cross-sections or coiled cross-sections as depicted in FIG. 2 as well as FIGS. 3a–3d.

Alternatively, films that shrink in more than one direction may also suitably be employed. For this aspect, the retroreflective-shrinkable laminate would typically be cut into pieces of the desired dimension (i.e. length, width, and shape) before shrinking.

The retroreflective sheeting may be cut or stamped into pieces wherein all the pieces have substantially the same size and shape. Alternatively, the sheeting may be cut in a random fashion providing a variety of different sizes and shapes. Depending on the initial shape of the piece of retroreflective sheeting in combination with the directional shrinking component(s) of the shrinkable film layer, the resulting retroreflective element can have a variety of regular as well as irregular shapes. For example, the retroreflective elements may be substantially cylindrical shaped as well as in the shape of pillows, cubes, etc.

A variety of shrinkable film materials are known. As used herein "shrinkable film" and "shrinkable layer" refers to a polymeric composition that is capable of decreasing in at least one dimension due to having elastic memory. There are two major types of shrinkable films. The first type includes polymeric films that are elastomeric at ambient temperature. Such films can be mechanically stretched and bonded to the non-viewing surface of the retroreflective sheeting. Representative examples include latex rubber, nitrile rubber and thermoplastic elastomers such as styrene-isoprene-styrene, styrene-butadiene-styrene, and styrene-ethylene/butylene-styrene (e.g. commercially available from Shell, location under the trade designations "Kraton").

The second type are polymeric films wherein elastic memory has been imparted by first extruding or otherwise molding the polymeric material into a desired shape. The polymer is then crosslinked or given properties of a crosslinked material by exposure to high energy radiation, e.g. electron beam, initiation of crosslinking by exposure to ultraviolet irradiation, or by chemical means, e.g. peroxides when polyolefins are used. The crosslinked polymeric material is then heated and deformed (i.e. stretched in at least one direction) and then locked in that condition by quenching or other suitable cooling, or in the alternative, the same process can be accomplished below the melt temperature by using a greater force to deform the polymer. The deformed material will retain its shape almost indefinitely until exposed to an elevated temperature sufficient to cause recovery, e.g. approximately 250° F. in the case of polyethylene. Such materials are also referred to as heat shrink films and heat recoverable films. Useful heat shrink materials are typically comprised of a semi-crystalline crosslinkable polymer, including but not limited to polyolefins (e.g., polyethylene, polypropylene), polyesters (e.g., polyethylene terephthalate), or polyamides (e.g., nylon), polyurethanes, polyvinylchloride, polyvinylidene fluoride typically, which has been stabilized against ultraviolet and oxidative degradation. The property of elastic memory may also be imparted to materials having the properties of cross-linked polymers (e.g. polyolefins and vinyl polymers) that have a sufficiently high molecular weight to give the polymer appreciable strength at temperature above the crystalline melt point. Blends of a non-crystalline polymer (e.g. neoprene) with a semi-crystalline polymer (e.g. polyethylene) are also useful as heat shrink materials. In the case of polyethylene and other polymers that are crosslinkable with radiation without significant degradation, electron beam crosslinking is highly desirable for web processing and precision control of crosslinking chemistry. Radiation crosslinked materials may optionally contain a pro-rad (a multifunctional acrylate or allylic monomer) to enhance the dose/modulus response and a loading of carbon black for increased reinforcement and thermal conductivity. Orientation of such materials typically follows the extrusion and crosslinking steps and is performed at temperatures above the crystalline melt temperature of the composition. The orientation locks into place when the material is cooled in its stretched state. Generally stretch ratios of up to about 8 are possible to accommodate transitions in diameter with recovery forces ranging up to about 15 pounds per linear inch, which can be controlled by the extension ratio and the crosslink density.

In order to obtain retroreflective elements having coiled or circular cross-sections, the recovery force of the shrinkable (e.g. film) layer is greater than the flexural strength of the retroreflective sheeting containing laminate. The recovery force is a function of both the elastic memory and the thickness of the shrinkable (e.g. film) layer. The shrinkable (e.g. film) layer preferably shrinks at least about 5% in at least one dimension in the laminate. The amount of shrinkage typically ranges up to about 25%. Since a significant amount of the recovery energy of the shrinkable film can be absorbed, it is common that the shrink (e.g. film) layer has a considerable higher degree of shrinkage alone, prior to bonding to the retroreflective sheeting. For example, the unconstrained (i.e. prior to bonding) shrink film may shrink 150%, 200%, 250%, etc. Typically, the unbonded shrink film shrinks no more than about 500%. Accordingly, shrinkable film layers of any degree of shrinking there between can usefully be employed. Higher shrink forces (percentage and thickness) in combination with low flexural strength retroreflective sheeting is preferred for obtaining tighter coiled (e.g. substantially solid) retroreflective elements. The Applicant has found that the presence of topcoats can increase the flexural strength of the retroreflective sheeting. Accordingly, it is preferred that when such topcoat is present the topcoat is provided after shrinking of the laminate. Although shrinkable films are typically continuous, discontinuous films may also usefully be employed. For example, strips of shrinkable film material or elastomeric strands may be bonded to the retroreflective sheeting.

Depending on the dimensions of the retroreflective sheeting or pieces thereof, the shrinkable film layer may be bonded either prior to or after cutting the retroreflective sheeting into a desired dimension (e.g. strip). The shrinkable film can be attached to the non-viewing surface in any suitable manner such as by means of an (e.g. pressure sensitive) adhesive, by heat lamination, chemical grafting, radio frequency welding, extrusion of the shrinkable film layer onto the non-viewing surface of the sheeting, coextrusion of the shrinkable film layer and backing layer of the sheeting, and combinations thereof.

Various known adhesive compositions are suitable for attaching a shrinkable film to the non-viewing surface. Hot melts and heat activated adhesive compositions can be employed to bond heat shrink films provided that the adhesive is sufficiently crosslinked or viscous such that it does not significantly flow during the heat shrink process. In the case of bonding stretched elastomeric films, the application temperature of the adhesive is preferably below the melt temperature of the elastomeric film. Preferred adhesive compositions for bonding heat shrinkable films to the non-viewing surface of the retroreflective sheeting are pressure sensitive adhesive compositions. Pressure sensitive adhesive are generally comprised of a base polymers such as natural rubbers, synthetic rubbers, block copolymers, polyvinyl ethers, acrylics, polyalphaolefins, silicones, and mixtures thereof often in combination with at least one tackifier. Various pressure sensitive adhesives are described for example in U.S. Pat. No. 6,632,522. High molecular weight acrylic-based adhesives such as described in U.S. Pat. Nos. 6,677,030 and 5,804,610 and rubber (natural and synthetic) based adhesives tend to exhibit adequate adhesion to heat shrink films comprised of polyolefins.

Alternatively or in addition to adhesive bonding, the surface of the heat shrink film may be chemically grafted by means of providing a surface coating, such as described in U.S. Pat. No. 4,563,388, incorporated herein by reference. This is achieved by graft polymerizing at least a portion of the surface of the heat shrink film with at least one monomer selected from the group consisting of acrylic acid, methacrylic acid, and esters thereof; acrylamide, methacrylamide; sterically non-hindered tertiary alkyl acrylamides and methacrylamides; secondary alkyl acrylamides and methacrylamides having three or less carbon atoms in the alkyl group; and N-vinylpyrrolidone. The graft polymerization is preferably conducted by coating the desired portion of the heat shrink film with a composition that comprises of at least one of the above monomers and irradiating that coated portion with ionizing radiation, e.g., electron beam radiation. A preferred coating comprises a major amount of N,N-dimethylacrylamide (DMA), minor amounts of a polyacrylate, e.g., trimethylolpropane triacrylate (TMPTA) and optionally trace amounts of a surfactant and an acid or mineral chain transfer agent, e.g., nitric acid or salts of silver, copper, etc. The coating can be applied to the heat shrink film by utilizing, for example, a fine knurl gravure coater and irradiated as a thin film by electron beam. The coating is typically thin (e.g. about 1 mil) as to not substantially increase the flexural strength of the laminate and not crack into separate portions as it is stretched. Graft polymerization onto the shrink film is particularly suitable when the non-viewing surface of the retroreflective sheeting includes an acid-containing polymer such as in the case when an ethylene methacrylic acid (EMMA) backing layer is present. Free radicals may be generated on the shrink film surface by use of ionizing energy (e.g. electron beam) that can react directly with the thin coating of an acrylate monomer (e.g. DMA) to covalently bond the functional groups of interest (e.g. amine) to the shrink film surface. When the non-viewing surface of the retroreflective sheeting backing (e.g. EMMA backing) is laminated to the shrink film at temperatures below the normal melt temperature of the shrink film, causing shrinkage of the laminate, but high enough to provide for good wetting of the film surfaces, sufficiently strong ionic attractions occur that can maintain a bond during the shrinkage process and have a tendency to also keep the surface of the retroreflective sheeting smooth (e.g. unwrinkled due to adhesive flow).

Preferred adhesives due to their known outdoor durability include those suitable for use for raised pavement markers and pavement marking tapes. For example, the adhesive may comprise natural rubber, polybutadiene, or an acrylic polymer and a tackifier, such as described in U.S. Pat. No. 5,906,889, WO 98/24978 and US 2003/0091815.

The non-viewing surface of the retroreflective sheeting may be heat laminated to the shrinkable (e.g. film) layer with a static or continuous method. Heat lamination generally involves, heat, time and pressure. One static heat lamination method includes contacting the non-viewing surface of the retroreflective sheeting and the shrinkable (e.g. film) layer and laminating in a heated platen press. In continuous methods, the film layer and sheeting are laminated together by passing them through a set of driven nip rolls. For example, the retroreflective sheeting and shrinkable (e.g. film) layer may be passed through a set of steel and/or rubber coated nip rolls. During heat lamination, one or both of the nip rolls can be heated in order to induce bonding. The conditions used in the lamination process vary depending on the type of films that are being laminated to each other. For example, films having a relatively low softening point such as linear low density polyethylene (LLDPE) are typically heat laminated at temperatures ranging from 180° F. to 330° F. Other materials such as polyethylene terephthalate, and high density polyethylene and polypropylene are typically heat laminated at a higher temperature, such as about 330° F. and greater.

Another method of making the retroreflective elements of the invention comprises providing an elongated member having a lengthwise surface, and bonding retroreflective sheeting about the elongated member such that the lengthwise surface is substantially covered with the major viewing surface of the sheeting. The elongated member may be comprise a core member that is an integral part of the interior of retroreflective element. Suitable core materials in polymeric materials (e.g. film), filaments (e.g. polymeric or non-polymeric) as well as an extruded thermoplastic strands. Alternatively, the elongated member may be a tool. For example, the method may comprise wrapping retroreflective sheeting about the mandrel such that the sheeting overlaps and the viewing surface is exposed, and bonding at least the overlap. Also contemplated is providing a hollow tubular core member and coating the tubular core member with a polymeric coating and optical elements such that the optical layer is formed in-line, rather than being provided as preformed retroreflective sheeting. This construction may be an intermediate that is concurrently or subsequently filled with a (e.g. thermoplastic) core material.

The non-viewing surface of the retroreflective sheeting may be bonded to the elongated core member and/or the retroreflective sheeting may be bonded to itself (e.g. an overlap) in any suitable manner, such as those previously described for bonding the non-viewing surface of the retroreflective sheeting to the shrinkable (e.g. film) layer. A wider array of hot melt adhesives can usefully be employed when a heat sensitive material is not present. It is typically convenient to apply a crosslinkable adhesive to the circumference of the elongated core member prior to contacting the core member with the non-viewing surface of the sheeting. The elongated core member has a diameter that is less than the cross-sectional width of the retroreflective element. For embodiments wherein the length of the core member is greater than the desired maximum dimension of the retroreflective element, the (e.g. continuous) elongated member substantially covered with retroreflective sheeting on the exposed surface may be cut into discreet retroreflective elements.

In each of these embodiments, the retroreflective sheeting may include additional layers disposed on the non-viewing surface. For example, the retroreflective sheeting may comprise an adhesive layer. Such adhesive layer may be employed to bond the shrinkable film layer to the non-viewing surface of the sheeting, may be employed to bond the non-viewing surface of the sheeting to the elongated core member, or may be employed to bond the retroreflective sheeting to itself forming an overlap or coil.

Alternatively, or in addition thereto, each of these embodiments may include an additional film layer that becomes the core material of the retroreflective element. Suitable film materials for this purpose include various thermoplastic and thermosetting polymeric materials and mixtures thereof. Illustrative thermoplastic materials include for example, uncrosslinked elastomer precursors (e.g., nitrile rubber formulations), ethylene-vinylacetate copolymers, polyesters, polyvinylacetate, polyurethanes, polyureas, acrylic resins, methacrylic resins, ethyleneacrylate/methacrylate copolymers, ethylene-acrylic acid/methacrylic acid copolymers, polyvinyl butyral, and the like. Illustrative examples of thermosetting materials include amino resins, thermosetting acrylic resins, thermosetting methacrylic resins, polyester resins, drying oils, alkyd resins, epoxy and phenolic resins, polyurethanes based on isocyanates, polyureas based on isocyanates, and the like.

Further, a topcoat may be applied to the viewing surface of the retroreflective sheeting or to the exposed surface of the retroreflective element. In some instances, such topcoat completes the optics of the sheeting, meaning that the sheeting has only a very low level of retroreflectivity until after the topcoat is applied. In other instances that topcoat improves the integrity of the retroreflective elements and aids in the element maintaining its shape. Topcoats generally transmit at least 70% of visible light. Preferably, the topcoat is sufficiently transparent such that it transmit 80% or greater, and most preferably 90% or greater of visible light. Suitable topcoats include but are not limited to polyurethanes, polyesters, acrylics, acid olefin copolymers such as ethylene acrylic acid, ethylene methacrylic acid, acid olefin copolymers neutralized with a base "ionomers", polyvinyl chloride and its copolymers, epoxies, polycarbonates and mixtures thereof. Preferred topcoats include coating compositions comprising polyurethane polymers, acrylic polymers, and blends thereof that preferably have been crosslinked. One exemplary topcoat is a water-borne urethane, commercially available from ICI Resins, Wilmington, Mass. under the trade designation "Neorez R-960" that has been combined with an aziridine cross-linker, also commercially available from ICI Resins, under the trade designation "CX-100". Other exemplary water-borne acrylic topcoats are described in U.S. patent application Ser. No. 10/417,642 filed Apr. 17, 2003; incorporated herein by reference. Various additives such as stabilizers, colorants, ultraviolet absorbers, antioxidants etc. can be added to the topcoat layer material to affect the processing, weathering, or retroreflected color.

Regardless of the manner in which the retroreflective elements of the invention were prepared, in some embodiments, at least a portion of the retroreflective elements comprise a solid core. This may be achieved for example by tightly coiling the sheeting, by twisting hollow (e.g. tubular shaped) strands, filling hollow elements with a core material, or by other means. Solid core elements are surmised to exhibit increased impact strength in comparison to hollow retroreflective elements.

The retroreflective elements of the invention may be filled with a variety of core materials. Suitable core materials include for example various polymeric materials. In particular, the various polymeric materials previously described for use as a film layer core material can suitably be employed. For example, such thermoplastic core material may be concurrently extruded into the center portion of hollow coils or tubular shaped strands during manufacture.

In other embodiments, the retroreflective elements are at least partially hollow, thus having a cavity. The cavity may be continuous from one cross-sectional end of the element to the other. Alternatively, the cavity may be discontinuous. Discontinuous cavities may be formed at only portions being tightly coiled or twisted (e.g. along the length of an element). Further, the cavity may be discontinuous on at least one or both cross-sectional ends of the retroreflective elements as a result of cutting intermediate element coils or strands into discreet elements such as can be accomplished with a hot knife. Providing at least partial cavities within the elements is surmised advantageous for allowing the binder (e.g. of the pavement marking) to wick inside the elements, thus forming a mechanical bond with the interior layers of the element, rather than merely a surface bond. In these embodiments, although the retroreflective element is at least partially hollow prior to being combined with the binder, the retroreflective element becomes increasingly solid once combined with the binder and thus acquires advantages, at least in part, of solid retroreflective elements as well.

The retroreflective elements may have virtually any size and shape, provided that the coefficient of retroreflection $(R_A)$, is at least about 3 cd/lux/m$^2$ according to Procedure B of ASTM Standard E809-94a using an entrance angle of $-4.0$ degrees and an observation angle of 0.2 degrees. For the majority of pavement marking uses, $R_A$ is typically at least about 7 cd/lux/m$^2$ and preferably about 8 cd/lux/m$^2$ and greater. The preferred maximum dimension (e.g. length) of the retroreflective elements, particularly for pavement marking uses, typically ranges up to about 10 mm and is preferably up to about 3 mm. The minimum dimension (e.g. cross-sectional width) is typically at least about 0.5 mm, and preferably no more than 5 mm. The retroreflective element may have any dimension between these stated dimensions as well.

Retroreflective sheeting employed in the present invention are generally described as "exposed-lens", "enclosed-lens", "embedded-lens" and "encapsulated-lens". Enclosed-lens retroreflective sheeting comprises a monolayer of retroreflective elements having a top film or cover layer (i.e. topcoat described herein) protecting the front surfaces thereof, e.g. a monolayer of microspheres having a reflective layer in optical association with the rear surfaces thereof, sometimes spaced apart by a spacer layer, and a cover layer (i.e. topcoat described herein) protecting the front surfaces of the microspheres. "Embedded-lens retroreflective sheeting" comprises a monolayer of microspheres having a space layer and a reflective layer in optical association with the rear surface thereof and a cover layer in which the front surfaces of the microspheres are embedded. An example of a cube-corner embedded-lens sheeting comprises a monolayer of cube-corners whose front and rear surfaces are embedded in polymeric matrices and a specular reflective layer coated or metallized on the surface of the cube-corners. "Encapsulated-lens retroreflective sheeting" comprises a monolayer of retroreflective elements, e.g. a monolayer of microspheres with reflective means in association with the rear surfaces and a cover layer (i.e. topcoat described herein) disposed to the front surface thereof or a layer of cube corner elements with a layer sealed to the rear surface thereof providing an air interface wherein the cube corner elements have a specular reflective metal layer thereon. The layer of cube corner elements also typically comprises a cover layer, i.e. the topcoat described herein. Enclosed-lens sheeting is generally preferred for its wet-reflective properties.

Microsphere-based sheeting, sometimes referred to as "beaded sheeting," is well known in the art and includes a multitude of microspheres typically at least partially embedded in a polymeric layer, and associated specular or diffuse reflecting materials (such as metallic vapor or sputter coatings, metal flakes, or pigment particles). It is important to note that such polymeric layer is also referred to as a binder layer. Illustrative examples of microsphere-based sheeting are disclosed in U.S. Pat. No. 4,025,159 (McGrath); U.S.

Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

Cube corner sheeting, sometimes referred to as prismatic, microprismatic, triple mirror or total internal reflection sheetings, typically include a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. Alternatively, reflective coatings may be applied on the back side of the lateral faces. Polymers for cube corner sheeting include poly(carbonate), poly(methyl methacrylate), poly(ethylene terephthalate), aliphatic polyurethanes, as well as ethylene copolymers and ionomers thereof. Cube corner sheeting may be prepared by casting directly onto a film, such as described in U.S. Pat. No. 5,691,846 (Benson, Jr.) incorporated herein by reference. Polymers for radiation-cured cube corners include cross-linked acrylates such as multifunctional acrylates or epoxies and acrylated urethanes blended with mono-and multifunctional monomers. Further, cube corners such as those previously described may be cast on to plasticized polyvinyl chloride film for more flexible cast cube corner sheeting. These polymers are often employed for one or more reasons including thermal stability, environmental stability, clarity, excellent release from the tooling or mold, and capability of receiving a reflective coating.

In embodiments wherein the sheeting is likely to be exposed to moisture, the cube corner retroreflective elements are preferably encapsulated with a seal film or the cubes can be specular reflective coated and back filled to totally embed the cube layer in water resistant polymer. In instances wherein cube corner sheeting is employed as the retroreflective layer, a backing layer may be present for the purpose of opacifying the article or article, improving the scratch and gouge resistance thereof, and/or eliminating the blocking tendencies of the seal film. Illustrative examples of cube corner-based retroreflective sheeting are disclosed in U.S. Pat. No. 4,588,258 (Hoopman); U.S. Pat. No. 4,775,219 (Appledom et al.); U.S. Pat. No. 4,895,428 (Nelson); U.S. Pat. No. 5,138,488 (Szczech); U.S. Pat. No. 5,387,458 (Pavelka); U.S. Pat. No. 5,450,235 (Smith); U.S. Pat. No. 5,605,761 (Burns); U.S. Pat. No. 5,614,286 (Bacon Jr.) and U.S. Pat. No. 5,691,846 (Benson, Jr.).

In some embodiments, the retroreflective sheeting comprises a diffusely reflecting polymeric material and optical elements that are substantially free of specular reflecting properties. The polymeric material may contain a colorant or an additional color layer may be provided. Fluorescent colored retroreflective sheeting are particularly useful for traffic control uses. Alternatively, however, the retroreflective sheeting may comprise a non-diffusely reflecting core (e.g. transparent core) in combination with specularly reflecting optical elements, such as would be provided by the glass beads described in U.S. Pat. Nos. 3,274,888 and 3,486,952. The use of microcrystalline beads such as glass-ceramic beads having such specular coating is also contemplated.

Retroreflective sheeting is commercially available. For example, retroreflective sheeting can be purchased from 3M Company, St. Paul, Minn. under the trade designation "3M Scotchlite Reflective License Plate Sheeting, Series 3750" and "3M Scotchlite Reflective Material—Series 6800 High-gloss Pressure Sensitive Adhesive Film". Retroreflective sheeting is commercially available from other manufacturers as well.

The pavement markings of the invention comprise the retroreflective elements of the invention embedded partially into the surface of a binder layer. Prior to combining the retroreflective elements with the binder, the retroreflective elements may be coated with one or more surface treatments to improve the adhesion of the reflective elements in the liquid binder. The retroreflective elements are preferably embedded in the binder to about 20–70%, and more preferably to about 40–60% of their diameters such that the retroreflective elements are adequately exposed. Although retroreflective elements embedded to a greater extent also provide some level of retroreflection, doing so diminishes the improvements contributed by the vertical extending surface area of the retroreflective elements such as improved angularity and/or improved wet retroreflectivity.

Various known binder materials may be employed including various one and two-part curable binders, as well as thermoplastic binders wherein the binder attains a liquid state via heating until molten. Common binder materials include polyacrylates, methacrylates, polyolefins, polyurethanes, polyepoxide resins, phenolic resins, and polyesters. A preferred binder includes a two-part composition having an amine component including one or more aspartic ester amines and optionally one or more amine-functional coreactants, an isocyanate component including one or more polyisocyanates, and material selected from the group of fillers, extenders, pigments and combinations thereof, described in U.S. Pat. No. 6,166,106, incorporated herein by reference. For reflective paints the binder typically comprises reflective pigment.

The retroreflective elements of the present invention can be dropped or cascaded onto binders such as wet paint, thermoset materials, or hot thermoplastic materials (e.g., U.S. Pat. Nos. 3,849,351, 3,891,451, 3,935,158, 2,043,414, 2,440,584, and 4,203,878). In these applications, the paint or thermoplastic material forms a matrix that serves to hold the retroreflective elements in a partially embedded and partially protruding orientation. The matrix can also be formed from durable two component systems such as epoxies or polyurethanes, or from thermoplastic polyurethanes, alkyds, acrylics, polyesters, and the like.

Figure 5:
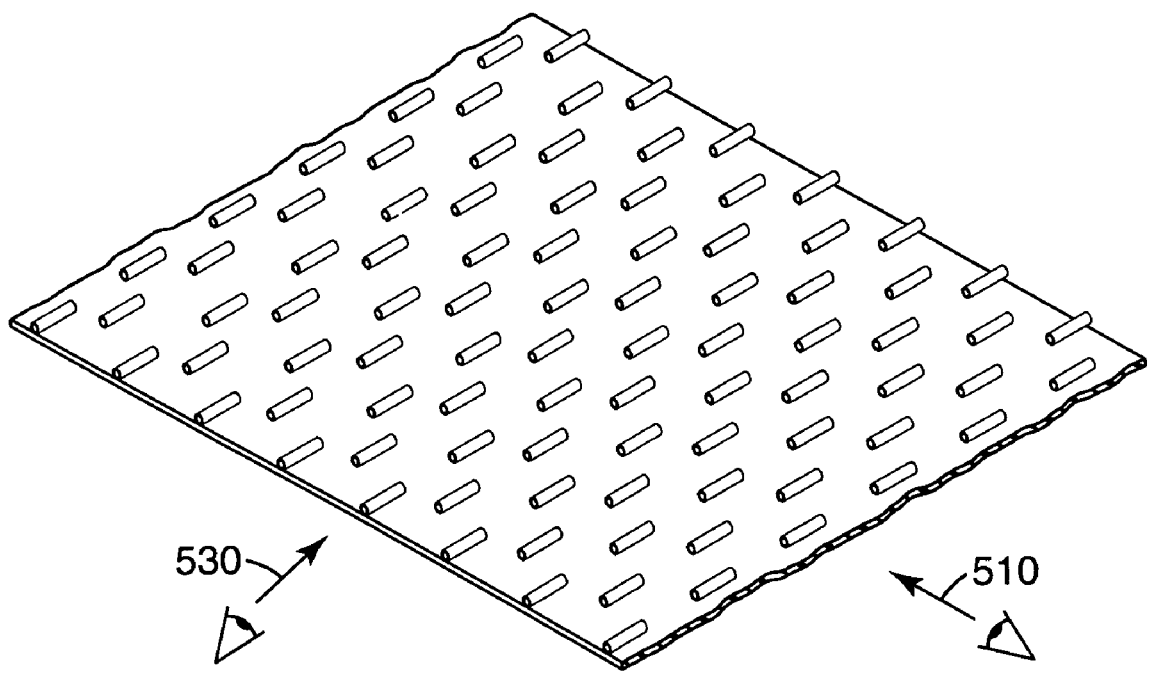
FIG. 5 depicts an illustrative laminate in accordance with the present invention.

Typically, the retroreflective elements of the present invention are applied to a roadway or other surface through the use of conventional delineation equipment. The retroreflective elements are dropped such that each retroreflective element comes to rest with one of its faces disposed in a downward direction such that it is embedded and adhered to the paint, thermoplastic material, etc. Once the paint or other film-forming material is fully cured, the retroreflective elements are firmly held in position to provide a retroreflective marking. The elements may be dropped in a random manner such as depicted in FIG. 1. If different sizes of retroreflective elements are used, they are typically evenly distributed on the surface. Alternatively, the retroreflective elements may be dropped in a pattern such as depicted in FIG. 5. FIG. 5 is highly retroreflective from incident light approaching from the direction of traffic 510, yet exhibits substantially lower reflection (if any) in the direction 530, (i.e. wherein the light shines upon the end portions rather than the longitudinal surface portion of the retroreflective elements.

The retroreflective elements of the present invention can also be used on preformed tapes (i.e. pavement marking sheets) wherein the retroreflective elements of the invention are generally provided on the viewing surface. On the opposing surface a backing such as acrylonitrile-butadiene polymer, polyurethane, or neoprene rubber is provided. The opposing surface of the pavement marking tape also generally comprises an adhesive (e.g., pressure sensitive, heat or solvent activated, or contact adhesive) beneath the backing. During use the adhesive is contacted to the target substrate, typically pavement.

Pavement markings often further comprise skid-resistant particles to reduce slipping by pedestrians, bicycles, and motor vehicles. The skid-resistant particles can be, for example, ceramics such as quartz, aluminum oxide, silicon carbide or other abrasive media.

Alternatively, the retroreflective elements can be employed as optical elements in retroreflective sheeting for use on signs, personal safety apparel, and other uses wherein retroreflectivity is useful or required.

The retroreflective elements and articles of the invention are suitable for a variety of retroreflective article traffic control devices as well as aviation and marine. Representative traffic control devices include for example wrap products such as, tape, decals, license plate sheeting, barricade sheeting and sign sheeting. Other retroreflective articles include roll-up signs, flags, banners, vehicle markings, segmented vehicle markings, decals, patches, promotional items, luggage, briefcases, book bags, backpacks, rafts, canes, umbrellas, animal collars, truck markings, trailer covers, curtains, etc. The article of the invention may comprise a pressure sensitive adhesive on the non-viewing surface in order to secure the article to a barrel, cone, post, roadway, license plate, barricade, or sign surface. Further, in other uses the article may be adhered or sewn onto clothing, shoes, etc. as is often the case for articles of clothing such as construction work zone vests, life jackets, rainwear, and the like.

In the retroreflective article of the invention, at least a portion of the elements will comprise at least one type of retroreflective elements (e.g. having a first retroreflective sheeting) of the invention. Thus, the inventive elements may be used in combination with other retroreflective elements (e.g. of the invention having a different size or different retroreflective sheeting) as well as with other optical elements (e.g. transparent microspheres).

A wide variety of optical elements may be employed on the viewing surface of the retroreflective elements of the invention as well as in combination with the retroreflective elements of the invention on the viewing surface of the articles. The optical elements may be in the form of any shape such as granules, flakes (e.g. aluminum flakes) and fibers provided that the elements are compatible with the size, shape, and geometry of the core. Typically, the optical elements have a refractive index of about 1.5 to about 2.6. For the presently preferred retroreflective element dimensions, having a dimension ranging from about 0.2 to about 10 millimeters, the optical elements preferably range in size from about 30 to about 300 micrometers in diameter.

Spheroidal transparent elements, also described herein as "beads", "glass beads" and "glass-ceramic beads" are typically preferred. The optical elements are preferably comprised of inorganic materials that are not readily susceptible to abrasion. The optical elements most widely used in pavement markings are made of soda-lime-silicate glasses. Although the durability is acceptable, the refractive index is only about 1.5, which greatly limits their retroreflective brightness. Higher-index glass optical elements of improved durability that can be used herein are taught in U.S. Pat. No. 4,367,919.

For increased crush strength, the beads are preferably microcrystalline.

Representative microcrystalline beads may be non-vitreous such as described in U.S. Pat. No. 4,564,556; incorporated herein by reference, or the beads may comprises a glass-ceramic material, such as described in U.S. Pat. No. 6,461,988, also incorporated herein by reference. Microcrystalline optical elements are also described in U.S. Pat. Nos. 4,758,469 and 6,245,700; incorporated herein by reference. The optical elements are preferably resistant to scratching and chipping, are relatively hard (above 700 Knoop hardness), and are made to have a relatively high index of refraction.

Typically, for optimal retroreflective effect, the optical elements have a refractive index ranging from about 1.5 to about 2.0 for optimal dry retroreflectivity, preferably ranging from about 1.5 to about 1.9. For optimal wet retroreflectivity, the optical elements have a refractive index ranging from about 1.7 to about 2.4, preferably ranging from about 1.9 to 2.4, and more preferably ranging from about 2.1 to about 2.3.

The retroreflective element may comprise optical elements having the same, or approximately the same refractive index. Alternatively, the retroreflective element may comprise optical elements having two or more refractive indices. Likewise, the pavement marking may comprise retroreflective elements (e.g. microspheres) having the same refractive index or retroreflective elements (e.g. microspheres) having two or more refractive indices. Further yet, the pavement marking may comprise a retroreflective elements in accordance with the invention in combination with one or more optical elements having the same or two or more refractive indices. Typically, optical elements having a higher refractive index perform better when wet and optical elements having a lower refractive index perform better when dry. When a blend of optical elements having different refractive indices is used, the ratio of the higher refractive index optical elements to the lower refractive index optical elements is preferably about 1.05 to about 1.4, and more preferably from about 1.08 to about 1.3.

The optical elements can be colored to retroreflect a variety of colors. Further, the optical elements can be color matched to the marking paints in which they are embedded. Techniques to prepare colored ceramic optical elements that can be used herein are described in U.S. Pat. No. 4,564,556. Colorants such as ferric nitrate (for red or orange) may be added in the amount of about 1 to about 5 weight percent of the total metal oxide present. Color may also be imparted by the interaction of two colorless compounds under certain processing conditions (e.g., $TiO_2$ and $ZrO_2$ may interact to produce a yellow color).

EXAMPLES

In the examples that follow the following materials and components were used:

Retroreflective Sheeting #1:

An enclosed-lens retroreflective sheeting commercially available from 3M Company, St. Paul, Minn. under the trade designation "3M Scotchlite Reflective License Plate Sheeting, Series 3750".

Retroreflective Sheeting #2:

An exposed-lens retroreflective sheeting was produced as follows:

Glass ceramic beads with an index of refraction of about 2.26 similar in composition to Example 23 of U.S. Pat. No. 6,461,988 except made with about 8% $ZrO_2$, 9% $Al_2O_3$, 3% $Sio_2$, 66% $TiO_2$, 14% CaO. A polyethylene coated paper obtained from Felix Schoeller Technical Papers, Inc., Pulaski, N.Y. was pre-heated to 175° C. The glass ceramic beads were cascaded onto the polyethylene side of the paper. The bead-coated sheet was passed over a second roller at about 175° C. and the beads were allowed to sink to approximately 30% of their diameter. A polyvinyl butyral binder solution was coated onto the bead-coated paper using a notchbar. The binder is the same as used in retroreflective sheeting commercially available from 3M Company under the trade designation "3M Scotchlite Reflective License Plate Sheeting, Series 3750". The notchbar had a gap of 0.08 mm. The spacecoat solution was dried in an oven at 135° C. Next aluminum was coated by vapor deposition at a coating thickness of about 900 angstroms. Thermoplastic Film #2 was heated to about 175° C. and laminated onto the aluminum. Finally the polyethylene coated paper was removed.

Retroreflective Sheeting #3:

Glass ceramic beads with an index of refraction of about 1.92 were made according to Example 5 of U.S. Pat. No. 6,479,417 except without the addition of MnO. The surface of the beads was then coated with a thin layer of aluminum in the manner described in U.S. Pat. No. 6,355,302. Thermoplastic Film #2 was pre-heated over a roller to a temperature of about 175° C. The beads were cascaded onto the film. The bead-coated sheet was passed over a second roller at about 175° C. and the beads were embedded to about 50% of their diameter producing an exposed-lens retroreflective sheeting.

Retroreflective Sheeting #4:

Yellow glass ceramic beads tinted with manganese with an index of refraction of about 1.92 were made according to Example 7 of U.S. Pat. No. 6,479,417 except with the addition of 1.4% MnO instead of 1%. The surface of the beads was then coated with a thin layer of aluminum in the manner described in U.S. Pat. No. 6,355,302.

Thermoplastic Film #2 was pre-heated over a roller to a temperature of about 175° C. The beads were cascaded onto the film. The bead-coated sheet was passed over a second roller at about 175° C. and the beads were embedded to about 50% of their diameter producing an exposed-lens retroreflective sheeting.

Retroreflective Sheeting #5

An enclosed-lens retroreflective sheeting commercially available from 3M Company, St. Paul, Minn. under the trade designation "3M Scotchlite Reflective Material—Series 6800 Highgloss Pressure Sensitive Adhesive Film".

Pavement Marking Film #1:

A pavement marking film made according to the table in the example on page 17 of U.S. Pat. No. 5,763,000, calandered to a thickness of about 1 mm.

Polyisocyanate Binder Precursor #1:

Polyisocyanate commercially available from Bayer Corporation, Pittsburg, Pa. under the trade designation "Desmodur N100".

Polyol Binder Precursor #1:

A clear polyol solution (obtained from Gibraltar Chemical Works, Inc; South Holland, Ill.) believed to contain about:
  79.3 wt-% polyester polyol commercially available from DOW Chemical Company, Midland, Mich. under the trade designation "Tone 0301"
  6.7 wt-% unsaturated polyester commercially available from Inolex Chemical Company, Philadelphia, Pa. under the trade designation "Lexorez 140565"
  12.9 wt-% acetone, Shell Chemicals, Houston, Tex.
  1.1 wt % xylene, Shell Chemicals
  dibutyl tin dilaurate catalyst believed to be present at less than 1% as can be obtained from OMG Group, Inc., Cleveland, Ohio Polyol Binder Precursor #2:

A pigment dispersion (obtained from Gibraltar) believed to contain about:
  40 wt-% polyester polyol commercially available from DOW Chemical Company, Midland, Mich. under the trade designation "Tone 0301"
  44 wt-% titanium dioxide commercially available from Dupont, Wilmington, Del. under the trade designation Ti-Pure R960
  9 wt-% methyl isobutyul ketone, Shell Chemicals
  2 wt-% sodium potassium aluminosilicate, as can be obtained from Desiccant City, a division of AGM Container Controls, Inc., Tucson, Ariz.
  5 wt-% believed to be dispersants and catalysts Paint Binder #1:

A two-part liquid pavement marking binder, commercially available from 3M Company, under the trade designation "3M Stamark Liquid Pavement Marking 1500 Part A and 1530 Crosslinker Part B".

Paint Binder #2:

Latex Traffic Paint made by Diamond Vogel and obtained from the State of Minnesota Department of Transportation; St. Paul, Minn.

Thermoplastic Binder #1

A thermoplastic pavement marking binder commercially available from Intermak Corp., St. Augustine, Fla. Under the trade designation "Thermoplastic Roadmarking Material Type TX 930-W".

Shrink Film #1

A LLDPE resin obtained from Dow Chemical Company under the trade designation "Dowlex 2045" was extruded into a 25 cm wide roll of sheeting having a film thickness of 0.30 mm. The sheeting was coated with a mixture of 93% dimethylacrylamide (DMA) available from Sigma-Aldrich, St. Louis, Mo. and 7% TMPTA, also available from Sigma-Aldrich, and irradiated with electron-beam to a dose of 5 Mrads at an accelerating voltage of 180 keV with an ESI Electrocurtain. The film was further irradiated with an additional dose of 5 Mrads to the same side as the DMA coating at a voltage of 180 keV and then on the opposite side to a dose of 3 Mrad and at a voltage of 180 keV to achieve a dose gradient through the film ranging from 10 Mrads (DMA side) down to 3 Mrads on the opposite side. The film was then nominally stretched 4× in a tenter oven at a temperature above its melt temperature (>125 C on the surface).

Shrink Film #2

A LLDPE resin obtained from Dow Chemical Company under the trade designation "Dowlex 2045" was extruded into a 25 cm wide roll of sheeting having film thickness of 0.64 mm. The sheeting was coated with a mixture of 87% DMA and 13% TMPTA and irradiated with e-beam to a dose of 5 Mrads at an accelerating voltage of 180 keV with the ESI Electrocurtain. The film was further irradiated with an additional dose of 7 Mrads to the same side as the DMA coating at a voltage of 280 keV to achieve a dose gradient through the film ranging from 12 Mrads down to essentially 0 Mrads. The film was then nominally stretched 2.2× in a tenter oven at a temperature above its melt temperature (>125 C on the surface).

Retroreflective Element Core Material—Thermoplastic Film #1

An EMMA film obtained from Dupont under the trade designation "Nucrel 600" was extruded into a film 25 cm wide and about 0.05 mm thick.

Retroreflective Element Core Material—Thermoplastic Film #2

A film consisting of 80% Nucrel 600 and 20% titanium dioxide (Ti-Pure R960) was extruded at a temperature of 205° C. into a ribbon measuring 25 cm wide by about 0.13 mm thick.

Preparation of Retroreflective Elements 1 to 8

For each of Retroreflective Elements 1–8, the shape and size of the elements varied unless specified otherwise. Various cross-sectional shapes such as those depicted in FIGS. 3a–3d were obtained. Unless specified otherwise, a combination of hollow and solid elements were obtained. Elements with discontinuous cavities were most prevalent. At least some of the variation is surmised to be caused by variation in the width of the strips due to being cut by hand.

Example 1

Retroreflective Element 1

The paper liner of Retroflective Sheeting #1 was removed, and the retroreflective sheeting's pre-applied adhesive adhesive was laminated to Shrink Film #1 using a Hot Can Laminator made by May Coating Technologies Inc, St. Paul, Minn. The above two films were pressure laminated together at a web speed of 10 ft/min and a nip roll pressure of 20 lbs. The laminated film was then razor blade slit into ribbons of ¼" by 12" strips (6.4 mm by 30.5 cm) and placed in a Baxter Constant Temperature Oven, (Model DN-63) for 1 minute at an oven temperature of 125° C. The curled strips of sheeting having a cross-sectional diameter of about 2–3 mm were then removed from the oven, cooled to room temperature and then passed through a Berlyn Pelletizer (Model Pell-2, Worchester Mass.) that chopped the coiled strips into small hollow cylindrical shaped retroreflective elements. The length of the retroreflective elements ranged from 2 mm to 5 mm with an average close to 2 mm, and the average diameter was about 2 mm.

Example 2

Retroreflective Element 2

Prior to pelletizing the retroreflective elements of Example #1, the curled strips were coated with a clear polyurethane topcoat. The polyurethane topcoat was made by mixing 160 grams of Polyisocyanate Binder #1 with 100 grams of Polyol Binder #1. This coating was coated onto the curled strips of sheeting by placing a small amount of the solution on gloved fingers, then pulling the curled strips through the solution. The polyurethane was allowed to cure at ambient conditions for 72 hours. Retroeflective elements were then pelletized in the same manner as Example #1.

Example 3

Retroreflective Element 3

A clear polyurethane topcoat was made by mixing 160 grams of Polyisocyanate Binder #1 with 100 grams of Polyol Binder #1. This topcoat was coated using a notch bar onto Retroreflective Sheeting #1. The notch bar gap was set to about 0.08 mm. The polyurethane was allowed to cure at ambient conditions for 72 hours. Retroreflective elements were made in the same manner as Example #1.

Example 4

Retroreflective Element 4

The back surface of Retroeflective Sheeting #2 was irradiated to a dose of 5 Mrads at an accelerating voltage of 250 keV to crosslink the EMMA to reduce its flow characteristics. Shrink Film #1 was laminated to the retroreflective sheeting by placing the low dose side (not the DMA-coated side) against the EMMA surface and then placing the layered construction into a circulating air oven at a temperature of 115° C. The construction was withdrawn from the oven in less than 1 minute and laminated with a rubber roller. The laminated construction was slit with a paper cutter into ¼" (6.3 mm) wide ribbons such that the shrink direction was transverse to the length of the ribbon. The ribbons were then shrunk into a rope by inserting them into a 125° C. circulating oven on trays and allowing them to shrink in an unrestricted manner. This took about 1 to 3 minutes. The rope was chopped by hand into retroreflective elements with lengths ranging from 2 mm to 5 mm, and diameter about 2 mm.

Example 5

Retroreflective Element 5

Retroreflective elements were made in same manner as Example 4 except that seven layers of Thermoplastic Film #1 were laminated to the shrink film prior to slitting with the paper cutter.

Example 6

Retroreflective Element 6

Retroreflective elements were made in same manner as Example 4 except that Retroreflective Sheeting #3 was utilized.

Example 7

Retroreflective Element 7

Retroreflective elements were made in same manner as Example 4 except that Retroreflective Sheeting #4 was utilized.

Example 8

Retroreflective Element 8

Retroreflective Sheeting #5 was laminated to Shrink Film #2. The sheeting's pre-applied pressure sensitive adhesive was laminated to the 25 mil LLDPE tented film with a DMA coating on the high dose side. Strips where then cut from the composite in the downweb direction measuring about 10 mm in width, and about 25 cm in length. A weight with a mass of about 45 grams was taped to one end of the strip. A heat gun was turned on and set to maximum air flow. The strip of composite was held at the opposite end of the weight. The LLDPE side of the strip was facing the heat gun. The weight was brought within about 3 cm from the front of the heat gun. The strip was lowered at a approximately 2 to 3 cm per second. The stretch was measured to be about 15% after curling into a "rope". The diameter of the ropes was measured to be about 3 mm (⅛ inch). The ropes were then chopped with a razor blade into small cylindrical shaped elements with an approximate length of 3 mm (⅛ inch).

Preparation of Pavement Markings 1 to 8

Example 9

200 of the retroreflective elements of Example 1 were counted and the weight was measured to be 1.60 grams. A calculation was made to determine the desired coating weight of elements on a pavement marking. Based on the average diameter, length, and weight, a coating weight of 0.008 grams per square centimeter (i.e. 1 element per square centimeter) was calculated to be near optimal for the ASTM E1710 geometry of 88.76 entrance angle.

A polyurethane solution was prepared by mixing 100 grams of Polyol Binder Precursor #2 with 80 grams of Polyisocyanate Binder Precursor #1. This solution was coated using a notch bar onto Pavement Marking Film #1. The notch bar gap was set at about 0.4 mm. After coating, 5.01 grams of retroreflective elements were randomly sprinkled onto the polyurethane. The example dimensions were 10 cm wide by 64 cm long.

Examples 10–16 were made in the same manner as Example 9 except Retroreflective Elements 2–8 were utilized respectively. In each instance the retroreflective elements were first weighed and then randomly sprinkled onto the binder resulting in about 1 element per square centimeter except for Example 16 that averaged 0.5 elements per square centimeter.

Example 17

Paint Binder #1 was applied to an aluminum panel at a thickness approximately 0.3 mm. This was done to simulate spraying the paint onto a road surface. The Retroreflective Elements of Example 2 were randomly sprinkled onto the binder such that there was about 1 element per square centimeter.

Example 18

Example 18 was prepared in the same manner as Example 17 with the exception that Paint Binder #2 was utilized.

Example 19

Thermoplastic Binder #1 was applied to an aluminum panel at a thickness approximately 0.3 mm. This was done to simulate extruding a thermoplastic onto a road surface. The temperature of application was about 205° C. The Retroreflective Elements of Example 2 were randomly sprinkled onto the binder such that there was about 1 element per square centimeter.

Example 20

Thin strips of Retroreflective Sheeting #1 were cut by hand to about a 4 mm width. Onto the non-viewing surface of the sheeting was applied ½" (13 mm) wide Scotch brand Double Sided Tape (Cat. 137, 3M Part No. 34-8507-7691-4). The strips were wound by hand barber pole style such that the adhesive was on the inside. The sheeting overlapped at intervals of about 2 mm. The coiled sheeting formed had a diameter about four times the thickness of the original sheeting. These coiled sheeting strips were then cut by hand into retroreflective elements about 6 mm long.

Example 21

The method just described in Example 20 was repeated with Retroreflective Sheeting #2 to produced retroreflective elements

Example 22

Thin strips of Retroreflective Sheeting #1 were cut by hand to about a 4 mm width. A length of the ½" (12.7 mm) wide tape was fastened on one end and then twisted along the length to form a sticky nearly round rope. The retroreflective sheeting strips were then wound by hand barber pole style with adhesive side in around the rope made from tape. This formed rope shapes had a diameter about five times the thickness of the original sheeting. These were then cut by hand into elements about 6 mm long.

Example 23

A multilayer elastomeric film having 1 mil low density polyethylene skin layers and a 4 mil core consisting of a styrene-ethylenelbutylene-styrene block copolymer, obtained from Shell under the trade designation "Kraton G-1657" (See U.S. Pat. No. 6,436,529) was stretched in machine direction at ambient temperature by hand to approximately 400% of its unstretched dimension. The release liner was removed from Retroreflective Sheeting #1 exposing a pressure sensitive adhesive that had been pre-applied to the non-viewing surface of the sheeting. The adhesive side was pressed by hand onto the stretched film. Then ½" strips were cut normal to the direction in which the film was stretched. The edges of the strips along the length curled towards each other such that the edges of the sheeting approached contacting. The curled strips had a circular cross-section at the end and a diameter of about 3/16". The adhesive unbonded slightly forming polygonal cross-sections. The curled strips can be cut into discreet elements.

Comparative Example A

A piece of pavement marking tape commercially available from 3M Company under the trade designation "3M Stamark High Performance Tape Series 380" was applied to an aluminum panel measuring 10 cm wide by 51 cm long. This product is a patterned pavement marking tape with about 1.75 refractive index ceramic beads embedded in a $TiO_2$ binder that is applied to the raised protuberances.

Comparative Example B

A piece of pavement marking tape commercially available from 3M Company under the trade designation "3M Stamark Tape Series 5730" was applied to an aluminum panel measuring 10 cm wide by 51 cm long. This product is a flat pavement marking with about 1.5 refractive index glass beads embedded in a $TiO_2$ filled binder. The retroreflective performance of this pavement marking is a good representation of the majority of pavement marking materials applied to the roadway, including beads on either paint or thermoplastic pavement marking materials.

Comparative Example C

A piece of pavement marking tape commercially available from 3M Company under the trade designation "3M Stamark Wet Reflective Pavement Marking Tape Series 820" was applied to an aluminum panel measuring 10 cm wide by 51 cm long. This product is a patterned pavement marking made using an enclosed-lens beaded retroreflective sheeting.

Test Methods
1. The Coefficient of Retroreflected Luminance ($R_L$) was measured under dry conditions as described in ASTM E1710, with an entrance angle of 88.76 degrees, and an observation angle of 1.05 degrees. Measurement units are $mcd/m^2/lx$.
2. The Coefficient of Retroreflected Luminance ($R_L$) was measured under continuous wetting conditions as described in ASTM E2176-01, with an entrance angle of 88.76 degrees, and an observation angle of 1.05 degrees. Measurement units are $mcd/m^2/lx$. This test method simulates performance during rain.
3. The Coefficient of Retroreflected Luminance ($R_L$) was measured under conditions of wetness as described in ASTM E2177-01, with an entrance angle of 88.76 degrees, and an observation angle of 1.05 degrees. Measurement units are $mcd/m^2/lx$. This test method simulates performance after rain.
4. The Coefficient of Retroreflected Luminance (RL) was measured similar to ASTM E2177-01 with the exception that about 3 cc of dishwashing soap commercially available from Lever Brothers, NY, N.Y. under the trade designation "Ultra Dove") was mixed to about 8 liters of water and the soap solution sprayed onto the pavement marking examples and RL then measured according to ASTM E2177-01. This was done to decrease the surface tension in order to better simulate actual pavement marking wet reflectivity after weathering on the road.

TEST RESULTS

Coefficient of Retroreflected Luminance ($R_L$) in $mcd/m^2/lx$ at 88.76 entrance angle and 1.05 observation angle

| Pavement Marking Example # | Retroreflective Element Example # | Dry - Test Method 1 | Continuous Wetting - Test Method 2 | Conditions of Wetness - Test Method 3 | Conditions of Wetness using soap - Test Method 4 |
|---|---|---|---|---|---|
| 9 | 1 | 300 | 125 | 121 | 203 |
| 10 | 2 | 1100 | 355 | 429 | 746 |
| 11 | 3 | 710 | 209 | 308 | 426 |
| 12 | 4 | 223 | 784 | 1200 | 1500 |
| 13 | 5 | 174 | 949 | 1200 | 1350 |
| 14 | 6 | 3780 | 130 | 240 | 88 |
| 15 | 7 | 3100 | 88 | 139 | 64 |
| 16 | 8 | 6200 | 3360 | 4020 | 3160 |
| 17 | 2 | 836 | 425 | 621 | 491 |
| 18 | 2 | 546 | 341 | 462 | 346 |
| 19 | 2 | 857 | 259 | 439 | 385 |
| A | | 490 | 197 | 258 | 189 |
| B | | 370 | 190 | 363 | 22 |
| C | | 1840 | 1030 | 1380 | 1140 |

The results show that all the exemplified retroreflective elements are suitable for use in pavement markings and other retroreflective articles. Examples 12 and 13 showed increased wet reflectivity with soap compared to Comparative C. However, only about 14% of the amount based on area of retroreflective sheeting was used in comparison to the viewing surface being covered with retroreflective sheeting such as in the case of Comparative C. The dry retroreflectivity of Examples 12 and 13 was lower than Comparative A. This was because the optics of this construction relies on a water layer on top in order to efficiently retroreflect light. Examples 12 and 13 are useful to enhance wet reflectivity, and can be used in combination with other retroreflective elements or optical elements (e.g. glass beads) to provide dry reflectivity. Examples 14 and 15 showed greatly increased dry reflectivity compared to Comparative C. The amount (i.e. area) of retroreflective sheeting used to make Examples 14 and 15 was only about 14% in comparison to Comparative C. The wet reflectivity with soap of Examples 14 and 15 was also low since this type of sheeting relies on an air interface in order to retroreflect an incident light ray. Examples 14 and 15 are useful to enhanced dry reflectivity, and can be used in combination with other wet retroreflective elements such as Examples 12 and 13. Example 16 utilized retroreflective sheeting having cube corner optical elements. Only about 7% of the amount of sheeting by area was used relative to Comparative C. Much higher levels of dry and wet performance were achieved. Examples 10 and 17–19 exhibited better retroreflected luminance than Comparative A and B, yet are surmised to be lower cost due to the diminished amount of retroreflective sheeting employed.

What is claimed is:

1. A pavement marking comprising a plurality of retroreflective elements partially embedded in a binder wherein the retroreflective elements have an exposed outer viewing surface comprising retroreflective sheeting and a layer beneath the viewing surface comprising a shrunk film layer.

2. The pavement marking of claim 1 wherein a cross-section of at least a portion of the retroreflective elements comprises an edge of the sheeting in a shape of at least one coil.

3. The pavement marking of claim 1 wherein a cross-section of at least a portion of the retroreflective elements comprises an edge of the sheeting in a substantially circular shape.

4. The pavement marking of claim 1 wherein at least a portion of the retroreflective elements comprise an outside diameter ranging from about 0.5 mm to 4 mm.

5. The pavement marking of claim 1 wherein at least a portion of the retroreflective elements comprise a substantially solid core.

6. The pavement marking of claim 1 wherein at least a portion of the retroreflective elements comprise a cavity.

7. The pavement marking of claim 6 wherein the cavity is discontinuous.

8. The pavement marking of claim 7 wherein the cavity of at least a portion of the retroreflective elements is at least partially filled with the binder.

9. The pavement marking of claim 1 wherein the retroreflective sheeting is selected from the group comprising exposed-lens sheeting and enclosed-lens sheeting.

10. The pavement marking of claim 9 wherein the retroreflective sheeting is exposed-lens sheeting comprising a specular reflective coating spaced apart from a monolayer of optical elements.

11. The pavement marking of claim 1 wherein the retroreflective sheeting comprises optical elements selected from glass microspheres, glass-ceramic microspheres, and cube corner elements.

12. The pavement marking of claim 11 wherein the optical elements are at least partially embedded in a polymeric layer.

13. The pavement marking of claim 11 wherein the optical elements are selected from transparent microspheres, colored transparent microspheres, and microspheres having a specular reflecting coating.

14. The pavement marking of claim 1 wherein the shrunk film is selected from the group consisting of heat shrinkable film and elastomeric film.

15. The pavement marking of claim 14 wherein the heat shrinkable film comprises a cross-linked semi-crystalline polymer.

16. The pavement marking of claim 1 further comprising at least one of the group comprising other retroreflective elements, optical elements, skid particles, and combination thereof.

17. A retroreflective element comprising an exposed outer viewing surface comprising retroreflective sheeting and a layer beneath the viewing surface comprising a film layer that has shrunk such that a cross-section of at least a portion of the retroreflective element comprises an edge of the retroreflective sheeting in a substantially circular or coil shape.

18. The retroreflective element of claim 17 wherein the element comprises a substantially solid core.

19. The retroreflective elements of claim 17 wherein the element is at least partially filled with at least one material selected from the shrinkable film, a filament, a polymeric material, and combinations thereof.

20. A retroreflective article comprising the retroreflective elements of claim 17 at least partially embedded in a binder.

21. The retroreflective article of claim 17 wherein is the article is retroreflective sheeting.

22. The retroreflective article of claim 17 wherein the article is selected from the group consisting of signs, tapes, personal safety apparel, and traffic devices.

23. A surface comprising a plurality of the retroreflective elements of claim 17 partially embedded in a binder.

24. A laminate comprising retroreflective sheeting having a viewing surface and an opposing surface and a layer that shrinks at least 25% in at least one dimension permanently bonded to the opposing surface of the sheeting.

25. The laminate of claim 24 wherein the unconstrained shrinkable layer shrinks about 150%.

26. A method of making retroreflective elements comprising:

providing a laminate comprising retroreflective sheeting having a viewing surface and an opposing surface and a layer that shrinks at least 25% in at least one dimension attached to the opposing surface of the sheeting; and shrinking the shrinkable film layer.

27. The method of claim 26 further comprising cutting the retroreflective sheeting before attaching the shrinkable film layer, after attaching the shrinkable film layer, after shrinking, and combinations thereof.

28. The method of claim 27 wherein attaching the shrinkable film layer to the sheeting is selected from bonding the film with an adhesive, bonding the film with heat lamination, chemical grafting to film to the sheeting, and combination thereof.

* * * * *

UNITED STATES PATENT AND TRADEMARK OFFICE
CERTIFICATE OF CORRECTION

PATENT NO. : 7,156,528 B2
APPLICATION NO. : 10/761770
DATED : January 2, 2007
INVENTOR(S) : Douglas E. Weiss It is certified that error appears in the above-identified patent and that said Letters Patent is hereby corrected as shown below:

Column 2
Line 23, After "combinations" delete "5".
Line 32, After "sheeting." delete "dr".

Column 11
Line 52, Delete "(Appledom" and insert -- (Appledorn --, therefor.

Column 15
Line 18, Delete "Sio$_2$," and insert -- SiO$_2$, --, therefor.
Line 56-61, Delete "Thermoplastic..........retroreflective sheeting." and insert the same on Line 55 as a continuation of the paragraph.

Column 16
Line 20, Delete "1.1 wt %" and insert -- 1.1 wt-% --, therefor.
Line 34, Delete "isobutyul" and insert -- isobutyl --, therefor.

Column 17
Line 4, Delete "(>125 C" and insert -- (>125° C. --, therefor.
Line 21, Delete "(>125 C" and insert -- (>125° C. --, therefor.
Line 50, Delete "Retroflective" and insert -- Retroreflective --, therefor.

Column 18
Line 13, Delete "Retroeflective" and insert -- Retroreflective --, therefor.
Line 32, Delete "Retroeflective" and insert -- Retroreflective --, therefor.
Line 41, Delete "I" and insert -- 1 --, therefor.

Column 20
Line 34, After "elements" insert -- . --.
Line 52, Delete "styrene-ethylenelbutylene- styrene" and insert -- styrene-ethylene/butylene- styrene --, therefor.

UNITED STATES PATENT AND TRADEMARK OFFICE
CERTIFICATE OF CORRECTION

PATENT NO. : 7,156,528 B2
APPLICATION NO. : 10/761770
DATED : January 2, 2007
INVENTOR(S) : Douglas E. Weiss It is certified that error appears in the above-identified patent and that said Letters Patent is hereby corrected as shown below:

<u>Column 22</u>
Line 10, Delete "(RL)" and insert -- ($R_L$) --, therefor.
Line 16, Delete "RL" and insert -- $R_L$ --, therefor.

<u>Column 24</u>
Line 25, In Claim 21, after "wherein" delete "is".

Signed and Sealed this

Twenty-seventh Day of March, 2007

JON W. DUDAS
*Director of the United States Patent and Trademark Office*